(12) United States Patent
Fisher et al.

(10) Patent No.: US 7,441,545 B1
(45) Date of Patent: Oct. 28, 2008

(54) FUEL PRESSURE RELIEF VALVE

(75) Inventors: Paul Fisher, Brighton, MI (US); Paul Mason, Dearborn, MI (US); Daniel Pangburn, Canton, MI (US); Werner Haarer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/954,631

(22) Filed: Dec. 12, 2007

(51) Int. Cl.
*F02M 37/04* (2006.01)
(52) U.S. Cl. ...................... 123/467; 123/446
(58) Field of Classification Search ............... 123/446, 123/447, 456, 467, 198 D, 514, 510–511
See application file for complete search history.

(56) References Cited

U.S. PATENT DOCUMENTS

| | | | |
|---|---|---|---|
| 1,693,355 A | 11/1928 | Thompson | |
| 3,387,623 A | 6/1968 | Essig | |
| 3,683,957 A | 8/1972 | Sands | |
| 3,746,263 A | 7/1973 | Reeder et al. | |
| 4,171,712 A | 10/1979 | DeForrest | |
| 4,186,768 A | 2/1980 | Kuester | |
| 4,274,380 A * | 6/1981 | de Vulpillieres | 123/456 |
| 4,300,357 A | 11/1981 | Jacyno | |
| 4,524,800 A | 6/1985 | Holland | |
| 4,781,213 A | 11/1988 | Kilayko | |
| 4,890,640 A | 1/1990 | King, Sr. | |
| 4,972,869 A | 11/1990 | Takasaki | |
| 5,036,823 A | 8/1991 | MacKinnon | |
| 5,074,272 A | 12/1991 | Bostick et al. | |
| 5,191,867 A * | 3/1993 | Glassey | 123/446 |
| 5,339,785 A | 8/1994 | Wilksch | 123/457 |
| 5,361,742 A * | 11/1994 | Briggs et al. | 123/506 |
| 5,477,829 A | 12/1995 | Hassinger et al. | |
| 5,511,528 A * | 4/1996 | Iwanaga et al. | 123/467 |
| 5,526,795 A | 6/1996 | Thompson et al. | |
| 5,655,892 A | 8/1997 | Cherniawski et al. | |
| 5,823,169 A | 10/1998 | Strohl et al. | |
| 5,843,212 A | 12/1998 | Nanaji | |
| 5,988,211 A | 11/1999 | Cornell | |
| 6,047,686 A | 4/2000 | Bohringer et al. | |
| 6,058,912 A | 5/2000 | Rembold et al. | |
| 6,073,487 A | 6/2000 | Dawson | |
| 6,530,364 B1 | 3/2003 | Romanek | |
| 6,772,739 B2 | 8/2004 | Veinotte et al. | |
| 6,772,741 B1 | 8/2004 | Pittel et al. | |
| 6,837,219 B2 | 1/2005 | York et al. | |
| 6,953,027 B2 | 10/2005 | Veinotte | |

(Continued)

*Primary Examiner*—Carl S Miller
(74) *Attorney, Agent, or Firm*—Michael Best & Friedrich LLP

(57) ABSTRACT

A fuel pressure relief valve includes a body defining a passageway having an inlet end in communication with a fuel pump and an outlet end in communication with a fuel rail. The valve also includes a seal member moveable between a first position in which the seal member is seated against the outlet end, and a second position in which the seal member is unseated from the outlet end. The valve further includes a biasing member biasing the seal member toward the second position. The seal member moves from the second position to the first position immediately after fuel pump shutoff to maintain pressure in the fuel rail. The seal member moves from the first position to the second position when fuel in the fuel rail drops to a residual pressure substantially less than the operating pressure to provide a leak path between the fuel pump and the fuel rail.

20 Claims, 3 Drawing Sheets

U.S. PATENT DOCUMENTS

| | | |
|---|---|---|
| 6,988,488 B2 | 1/2006 | Pursifull et al. |
| 7,011,077 B2 | 3/2006 | Veinotte |
| 7,066,152 B2 | 6/2006 | Stroia et al. |
| 7,069,915 B2 | 7/2006 | Brandenburg et al. |
| 7,225,796 B2 | 6/2007 | Reddy et al. |
| 7,246,607 B2 | 7/2007 | Burke et al. |
| 2004/0250795 A1 | 12/2004 | Stroia et al. |
| 2006/0260587 A1 | 11/2006 | Woody |

\* cited by examiner

FUEL PRESSURE RELIEF VALVE

FIELD OF THE INVENTION

The present invention relates to fuel systems, and more particularly to fuel pressure relief valves in fuel systems.

BACKGROUND OF THE INVENTION

Fuel leakage in automotive fuel systems may occur during periods of non-operation of the automobile. Such leakage may occur through fuel injectors, or through various components in the fuel system by permeation, because most modern fuel injection systems remain pressurized after the automobile is turned off. Maintaining fuel pressure in the fuel system after an automobile is turned off is a common practice of automotive manufacturers to maintain the readiness of the fuel system for quick engine restarting (i.e., "hot-restarts"), and also to minimize emissions during restart and avoid delays in restarting.

Fuel leakage is particularly exacerbated by diurnal temperature cycles. During a typical day, the temperature rises to a peak during the middle of the day. In conjunction with this temperature rise, the pressure in the fuel system of a non-operating automobile also increases, often resulting in leakage through the fuel injectors and other fuel system components. This temperature cycle repeats each day, thus often resulting in a repeated cycle of fuel leakage and evaporative emissions.

SUMMARY OF THE INVENTION

Relieving fuel system pressure during such diurnal temperature cycles can reduce fuel leakage and evaporative emissions from the fuel system.

The present invention provides, in one aspect, a fuel pressure relief valve configured for use in a fuel system including a fuel pump and a fuel rail that receives pressurized fuel from the fuel pump at an operating pressure. The fuel pressure relief valve includes a body defining a passageway therein, the passageway having an inlet end in fluid communication with the fuel pump and an outlet end in fluid communication with the fuel rail such that pressurized fuel flows in a first fuel-flow direction from the inlet end of the passageway to the outlet end of the passageway during fuel pump operation. The fuel pressure relief valve also includes a seal member moveable between a first position in which the seal member is seated against the outlet end of the passageway, and a second position in which the seal member is unseated from the outlet end of the passageway. The seal member is in the second position during fuel pump operation. The fuel pressure relief valve further includes a biasing member biasing the seal member toward the second position. The seal member moves from the second position to the first position immediately after fuel pump shutoff to maintain the pressure in the fuel rail substantially at the operating pressure. The seal member moves from the first position to the second position when fuel in the fuel rail drops to a residual pressure substantially less than the operating pressure to provide a leak path between the fuel pump and the fuel rail in a second fuel-flow direction opposite the first fuel-flow direction.

The present invention provides, in another aspect, a fuel system including a fuel pump operable to discharge pressurized fuel at an operating pressure, a fuel rail that receives pressurized fuel from the fuel pump, and a body defining a passageway therein. The passageway includes an inlet end in fluid communication with the fuel pump and an outlet end in fluid communication with the fuel rail such that pressurized fuel flows in a first fuel-flow direction from the inlet end of the passageway to the outlet end of the passageway during fuel pump operation. The fuel system also includes a seal member moveable between a first position in which the seal member is seated against the outlet end of the passageway, and a second position in which the seal member is unseated from the outlet end of the passageway. The seal member is in the second position during fuel pump operation. The fuel system further includes a biasing member biasing the seal member toward the second position. The seal member moves from the second position to the first position immediately after fuel pump shutoff to maintain the pressure in the fuel rail substantially at the operating pressure. The seal member moves from the first position to the second position when fuel in the fuel rail drops to a residual pressure substantially less than the operating pressure to provide a leak path between the fuel pump and the fuel rail in a second fuel-flow direction opposite the first fuel-flow direction.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
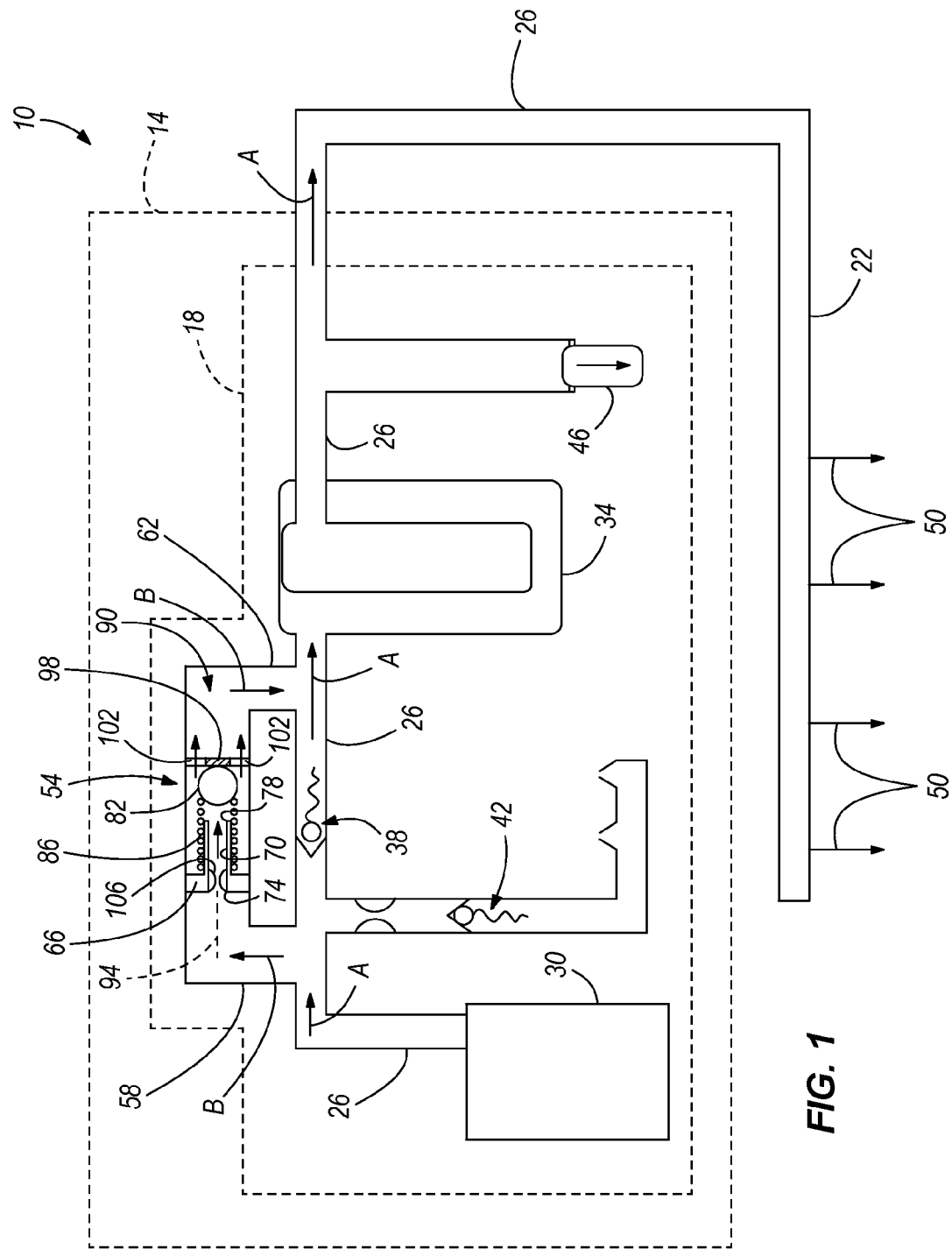
FIG. 1 is a schematic view of a fuel system incorporating a fuel pressure relief valve of the present invention, illustrating the fuel system in operation.
Figure 2:
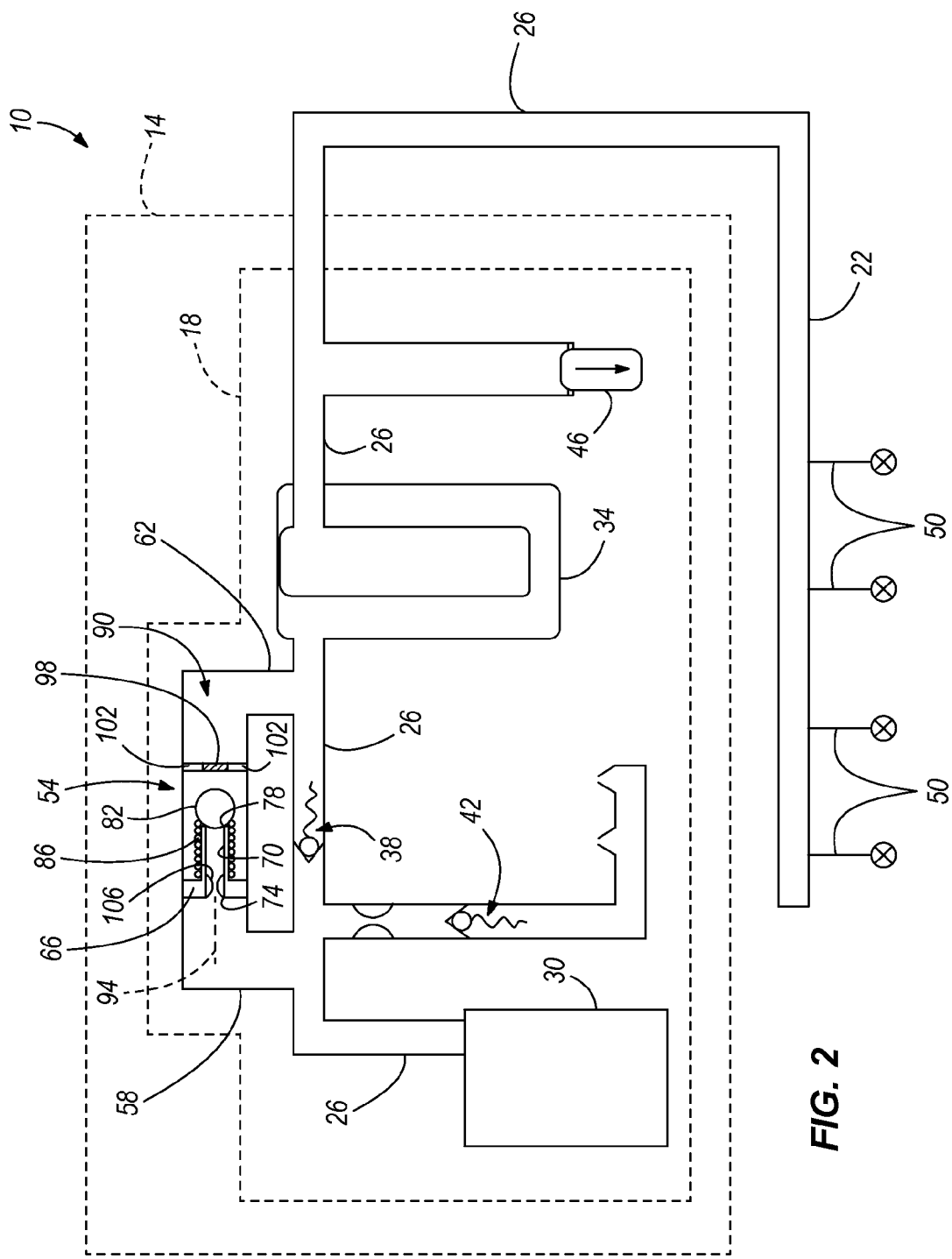
FIG. 2 is a schematic view of the fuel system of FIG. 1, illustrating the fuel system immediately after deactivation of the system.
Figure 3:
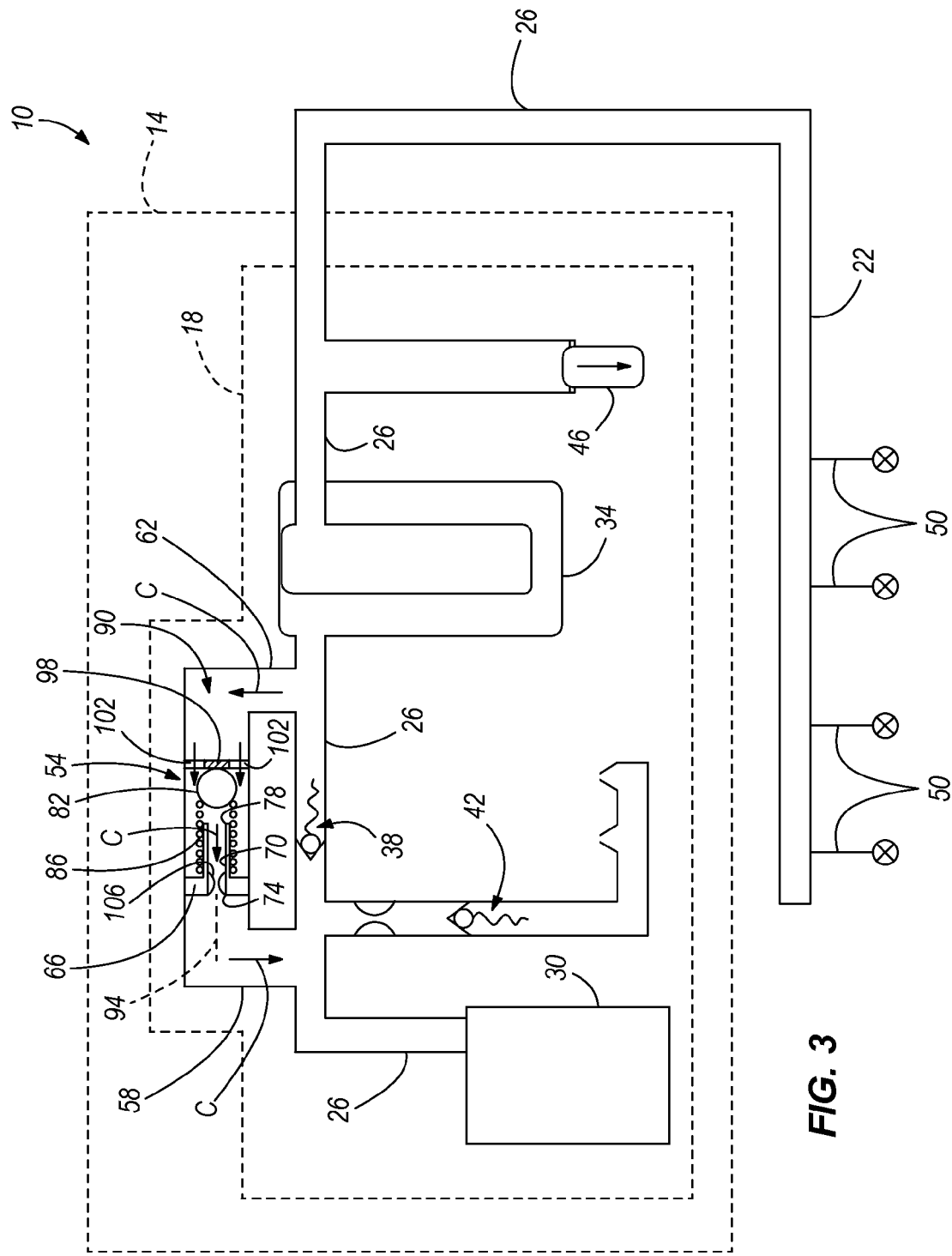
FIG. 3 is a schematic view of the fuel system of FIG. 1, illustrating the deactivated fuel system after a diurnal temperature cycle.

FIGS. 1-3 schematically illustrate a fuel system 10 including a fuel tank 14, a fuel pump module 18 positioned in the fuel tank 14, a fuel rail 22 coupled to an engine, and a fuel line 26 fluidly communicating the fuel pump module 18 and the fuel rail 22. The fuel pump module 18 includes a fuel pump 30 and a fuel filter 34 in fluid communication with the fuel line 26, a portion of which is contained within the fuel pump module 18. The fuel pump module 18 also includes a normally closed, spring-biased check valve 38 in fluid communication with the fuel line 26 between the fuel pump 30 and the fuel filter 34. The fuel pump module 18 further includes a rollover check valve 42 and a fuel pressure relief valve 46 in fluid communication with the fuel line 26.

In a conventional manner, the fuel pump 30, during operation, discharges pressurized fuel at an operating pressure through the portion of the fuel line 26 between the fuel pump 30 and the fuel filter 34 causing the check valve 38 to open. Fuel then flows through the fuel filter 34 and through the rest of the fuel line 26 to fill the fuel rail 22 with pressurized fuel. Depending upon the engine with which the fuel system 10 is utilized, the operating pressure of the fuel discharged by the pump 30 may be between about 1 bar (100 kPa) and about 6 bars (600 kPa). Fuel injectors 50 fluidly connected to the fuel rail 22 transfer the pressurized fuel in the fuel rail 22 to the engine for consumption. Also, in a conventional manner, the rollover check valve 42 closes to substantially prevent fuel in the fuel tank 14 from leaking into the fuel line 26 in the event of a vehicle rollover. Further, in a conventional manner, the fuel pressure relief valve 46 opens in the event that a blockage in the fuel system 10, during operation of the fuel system 10, causes the pressure in the fuel line 26 and fuel rail 22 to rise above the predetermined relief level of the fuel pressure relief valve 46.

The fuel system 10 also includes a diurnal pressure relief valve 54 in fluid communication with the fuel line 26. In the illustrated configuration of FIGS. 1-3, the pressure relief valve 54 is fluidly connected to the fuel line 26 in a parallel relationship by an inlet branch line 58 positioned upstream of the check valve 38, with respect to the fuel-flow direction indicated by arrows A during operation of the fuel pump 30, and an outlet branch line 62 downstream of the check valve 38 with respect to the fuel-flow direction indicated by arrows A. As a result, pressurized fuel discharged from the fuel pump 30 may flow through the check valve 38 or be diverted through the pressure relief valve 54 to bypass the check valve 38.

With reference to FIG. 1, the diurnal pressure relief valve 54 includes a body 66 defining a passageway 70 therein. The passageway 70 has an inlet end 74 in fluid communication with the inlet branch line 58 and the fuel pump 30. The passageway 70 also has an outlet end 78 in fluid communication with the outlet branch line 62 and the fuel rail 22. The pressure relief valve 54 also includes a seal member 82 movable between a first position in which the seal member 82 is seated against the outlet end 78 of the passageway 70 and a second position in which the seal member 82 is unseated from the outlet end 78 of the passageway 70. In the illustrated schematics of the pressure relief valve 54, the seal member 82 is configured as a spherical ball, and the outlet end 78 of the passageway 70 includes an annular shape to at least partially receive the ball to close the outlet end 78 of the passageway 70. Alternatively, the seal member 82 and the outlet end 78 of the passageway 70 may incorporate any of a number of different configurations to allow the seal member 82 to selectively seat against and close or seal the outlet end 78 of the passageway 70.

The pressure relief valve 54 also includes a biasing member 86 biasing the seal member 82 away from the outlet end 78 of the passageway 70. In the illustrated schematics of the pressure relief valve 54, the biasing member 86 is configured as a compression spring positioned between the body 66 and the seal member 82. Alternatively, the pressure relief valve 54 may incorporate other biasing members to bias the seal member 82 away from the outlet end 78 of the passageway 70.

The pressure relief valve 54 further includes a retainer 90 positioned downstream of the seal member 82 with respect to the fuel-flow direction indicated by arrows A. As shown in FIG. 1, the biasing member 86 biases the seal member 82 toward the retainer 90 when the seal member 82 is unseated from the outlet end 78 of the passageway 70. The retainer 90 includes at least one projection extending in a direction toward a central axis 94 of the passageway 70. In the illustrated schematic of the pressure relief valve 54, the retainer 90 is configured as a plate 98 having a plurality of apertures 102 to allow the passage of fuel through the plate 98. Alternatively, the retainer 90 may be configured as another projection extending in a direction toward the central axis 94 of the passageway 70.

With continued reference to FIG. 1, the pressure relief valve 54 also includes an orifice 106 in fluid communication with the passageway 70 to decrease the flow rate of pressurized fuel through the passageway 70 in the fuel-flow direction indicated by arrows A. As a result, most of the pressurized fuel discharged from the fuel pump 30 during operation of the fuel pump 30 flows through the check valve 38, rather than bypassing the check valve 38 via the pressure relief valve 54. The orifice 106 may also limit the flow rate of fuel through the passageway 70 in the event of a vehicle rollover to limit the amount of fuel that escapes from the fuel tank 14 via the fuel line 26. In the illustrated schematic of the pressure relief valve 54, the orifice 106 is represented as a nozzle-diffuser element. Alternatively, the orifice 106 may be configured as a substantially straight aperture through an end plate toward the inlet end 74 of the passageway 70.

Although the components of the pressure relief valve 54, including the body 66, the seal member 82, the biasing member 86, the retainer 90, and the orifice 106, are schematically shown positioned within a passageway fluidly connecting the inlet branch line 58 and the outlet branch line 62, it should be known that the body 66 of the pressure relief valve 54 may be configured as a separate and distinct component that is connectable to the fuel line 26 in a parallel relationship. As such, the seal member 82, the biasing member 86, the retainer 90, and the orifice 106 may be integrated within the body 66. Further, in some constructions, the orifice 106 and the retainer 90 may be integrally formed as one piece with the body 66.

FIG. 1 illustrates the fuel system 10 in an operational state after either a hot-restart or after the occurrence of a diurnal temperature cycle. As discussed above, the fuel pump 30 discharges pressurized fuel at an operating pressure in a fuel-flow direction (indicated by arrows A) through the portion of the fuel line 26 between the fuel pump 30 and the fuel filter 34 to maintain the check valve 38 open. Fuel flows through the fuel filter 34 and through the remainder of the fuel line 26 to fill the fuel rail 22 with pressurized fuel. Also, during operation of the fuel system 10, some of the pressurized fuel discharged from the fuel pump 30 is diverted from the fuel line 26 through the inlet branch line 58 to pass through the pressure relief valve 54 (the diverted fuel flow indicated by arrows B). The diverted fuel flow exiting the pressure relief valve 54 is redirected back to the fuel line 26 by the outlet branch line 62, where it can merge with the undiverted fuel flow that passed through the check valve 38.

The fuel flowing through the passageway 70 of the pressure relief valve 54 maintains the seal member 82 unseated from the outlet end 78 of the passageway 70. As such, fuel is allowed to flow through the orifice 106 and the passageway 70, exit the outlet end 78 of the passageway 70 and flow around the seal member 82, and flow through the apertures 102 in the retainer 90. For example, in one mode of operation of the fuel system 10, the flow rate of the diverted fuel flow through the pressure relief valve 54 is at least about 100 mL/minute.

With reference to FIG. 2, the fuel system 10 is shown immediately after deactivation or "key-off" of a vehicle's ignition system. Following key-off of the vehicle's ignition system, the fuel pump 30 is deactivated to cease discharge of pressurized fuel in the fuel-flow direction indicated by arrows A to the fuel line 26, and the fuel injectors 50 are also deactivated to cease transfer of pressurized fuel in the fuel rail 22 to the engine. As a result, the flow of fuel in the fuel line 26 stops, and back-flow of fuel to the fuel tank 14 is substantially prevented by the now-closed check valve 38. Because the stagnated fuel in the fuel line 26 is under pressure, the fuel in the outlet branch line 62 is forced to quickly reverse its direction of flow back into the pressure relief valve 54, causing the pressure relief valve 54 to close to substantially prevent back-flow of fuel to the fuel tank 14. As a result, the fuel trapped in the fuel line 26 and the fuel rail 22 is maintained at a pressure substantially equal to the operating pressure of fuel in the fuel line 26 and the fuel rail 22 during operation of the fuel pump 30.

Specifically, as shown in FIG. 2, the back-flow of fuel in the outlet branch line 62 floods through the apertures 102 in the retainer 90 and exerts a pressure on the seal member 82, thereby causing the seal member 82 to move to the first position in which it is seated against the outlet end 78 of the passageway 70 against the bias of the biasing member 86. In the illustrated schematics of the pressure relief valve 54, the spring rate of the biasing member 86 is selected to allow the seal member 82 to remain seated against the outlet end 78 of the passageway 70 when the residual static pressure of fuel in the fuel rail 22 and fuel in the portion of the fuel line 26 downstream of the check valve 38 (with respect to the fuel-flow direction indicated by arrows A in FIG. 1) is at least about 15 kPa. Alternatively, the spring rate of the biasing member 86 may be selected to allow the seal member 82 to remain seated against the outlet end 78 of the passageway 70 when the residual static pressure of fuel in the fuel rail 22 and fuel in the portion of the fuel line 26 downstream of the check valve 38 is between about 10 kPa and about 100 kPa, or in other constructions, between about 10 kPa and about 50 kPa.

With reference to FIG. 3, the deactivated fuel system 10 is shown after the occurrence of a diurnal temperature cycle. As discussed above, diurnal temperature cycles cause the residual static pressure in the fuel line 26 and the fuel rail 22 to fluctuate with the rising and falling temperatures of a diurnal temperature cycle. During the cool-down period of a diurnal temperature cycle, the trapped fuel in the fuel line 26 and fuel rail 22 cools and as a result, the residual static pressure in the fuel line 26 and fuel rail 22 decreases. When the residual static pressure in the fuel line 26 and fuel rail 22 reaches the predetermined pressure value at which the pressure relief valve 54 opens, the biasing member 86 unseats the seal member 82 from the outlet end 78 of the passageway 70 and pushes the seal member 82 to the second position toward or against the retainer 90 to provide a leak path (indicated by arrows C) between the fuel pump 30 and the fuel rail 22 in a second fuel-flow direction opposite the fuel-flow direction indicated by arrows A during fuel pump operation.

Specifically, as shown in FIG. 3, fuel in the outlet branch line 62 floods through the apertures 102 in the retainer 90, around the seal member 82, through the outlet end 78 of the passageway 70, through the passageway 70, and through the inlet end 74 of the passageway 70 to flow back to the fuel tank 14 via the inlet branch line 58, the fuel line 26, and the fuel pump 30. In the illustrated schematic of the pressure relief valve 54, the spring rate of the biasing member 86 is selected to unseat the seal member 82 from the outlet end 78 of the passageway 70 when the residual static pressure of fuel in the fuel rail 22 and fuel in the portion of the fuel line 26 downstream of the check valve 38 (with respect to the fuel-flow direction indicated by arrows A in FIG. 1) is about 15 kPa or less. Alternatively, the spring rate of the biasing member 86 may be selected to unseat the seal member 82 from the outlet end 78 of the passageway 70 when the residual static pressure of fuel in the fuel rail 22 and fuel in the portion of the fuel line 26 downstream of the check valve 38 is between about 10 kPa and about 100 kPa, or in other constructions, between about 10 kPa and about 50 kPa.

With reference to FIG. 3, immediately after the seal member 82 is unseated from the outlet end 78 of the passageway 70, the pressure differential between the portion of the fuel line 26 downstream of the check valve 38 (with respect to the fuel-flow direction indicated by arrows A in FIG. 1) and the portion of the fuel line 26 upstream of the check valve 38 (with respect to the fuel-flow direction indicated by arrows A in FIG. 1) causes some of the fuel in the outlet branch line 62 to back-flow through the pressure relief valve 54 as described above and leak back to the fuel tank 14. Such back-flow through the pressure relief valve 54 substantially ceases when the residual static pressure in the fuel line 26 equalizes with the pressure in the fuel tank 14, which initially is at about 0 kPa before the opening of the pressure relief valve 54. The pressure relief valve 54 remains open as shown in FIG. 3 during subsequent diurnal temperature cycles to substantially prevent the build-up of pressure in the fuel line 26 or the fuel rail 22, thereby reducing fuel leakage and the associated evaporative emissions from the components of the fuel system (e.g., the fuel injectors 50).

Upon reactivation of the fuel system 10 from the non-operational state shown in FIG. 3, the fuel pump 30 discharges pressurized fuel through the fuel line 26 to re-open the check valve 38. As discussed above, a portion of the pressurized fuel in the fuel line 26 is diverted through the inlet branch line 58 and through the passageway 70 of the pressure relief valve 54 to re-open the pressure relief valve 54 such that the fuel system 10 again resembles the operational state shown in FIG. 1.

Various features of the invention are set forth in the following claims.

What is claimed is:

1. A fuel pressure relief valve configured for use in a fuel system including a fuel pump and a fuel rail that receives pressurized fuel from the fuel pump at an operating pressure, the fuel pressure relief valve comprising:

a body defining a passageway therein, the passageway having an inlet end in fluid communication with the fuel pump and an outlet end in fluid communication with the fuel rail such that pressurized fuel flows in a first fuel-flow direction from the inlet end of the passageway to the outlet end of the passageway during fuel pump operation;

a seal member moveable between a first position in which the seal member is seated against the outlet end of the passageway, and a second position in which the seal member is unseated from the outlet end of the passageway, the seal member being in the second position during fuel pump operation; and a biasing member biasing the seal member toward the second position;

wherein the seal member moves from the second position to the first position immediately after fuel pump shutoff to maintain the pressure in the fuel rail substantially at the operating pressure; and wherein the seal member moves from the first position to the second position when fuel in the fuel rail drops to a residual pressure substantially less than the operating pressure to provide a leak path between the fuel pump and the fuel rail in a second fuel-flow direction opposite the first fuel-flow direction.

2. The fuel pressure relief valve of claim 1, wherein the fuel system includes a fuel line fluidly communicating the inlet end of the fuel pressure relief valve and the fuel pump, and wherein the residual pressure in the fuel rail is greater than the pressure in the fuel line between the inlet end of the fuel pressure relief valve and the fuel pump when the biasing member moves the seal member from the first position to the second position.

3. The fuel pressure relief valve of claim 2, wherein the biasing member moves the seal member from the first position to the second position when the residual pressure in the fuel rail drops to a pressure between about 10 kPa and about 100 kPa.

4. The fuel pressure relief valve of claim 1, further comprising an orifice in fluid communication with the passageway, wherein the orifice decreases the flow rate of pressurized fuel through the passageway in the first fuel-flow direction.

5. The fuel pressure relief valve of claim 4, wherein the orifice is positioned at least partially within the passageway.

6. The fuel pressure relief valve of claim 1, further comprising a retainer positioned downstream of the seal member in the first fuel-flow direction, wherein the seal member engages the retainer when the seal member is in the second position, and wherein pressurized fuel flows past the retainer in the first fuel-flow direction during fuel pump operation.

7. The fuel pressure relief valve of claim 6, wherein the passageway defines a central axis, wherein the retainer includes at least one projection extending in a direction toward the central axis, and wherein the seal member engages the at least one projection when the seal member is in the second position.

8. The fuel pressure relief valve of claim 1, wherein the biasing member includes a compression spring.

9. The fuel pressure relief valve of claim 1, wherein the seal member includes a spherical ball.

10. The fuel pressure relief valve of claim 1, wherein the fuel system includes a fuel line fluidly communicating the fuel pump and the fuel rail, wherein the fuel system includes a check valve positioned in the fuel line, and wherein the fuel pressure relief valve is fluidly connected with the fuel line in a parallel relationship such that pressurized fuel discharged by the fuel pump flows through one of the check valve and the pressure relief valve during fuel pump operation.

11. A fuel system comprising:
a fuel pump operable to discharge pressurized fuel at an operating pressure;
a fuel rail that receives pressurized fuel from the fuel pump;
a body defining a passageway therein, the passageway having an inlet end in fluid communication with the fuel pump and an outlet end in fluid communication with the fuel rail such that pressurized fuel flows in a first fuel-flow direction from the inlet end of the passageway to the outlet end of the passageway during fuel pump operation;
a seal member moveable between a first position in which the seal member is seated against the outlet end of the passageway, and a second position in which the seal member is unseated from the outlet end of the passageway, the seal member being in the second position during fuel pump operation; and
a biasing member biasing the seal member toward the second position;
wherein the seal member moves from the second position to the first position immediately after fuel pump shutoff to maintain the pressure in the fuel rail substantially at the operating pressure; and
wherein the seal member moves from the first position to the second position when fuel in the fuel rail drops to a residual pressure substantially less than the operating pressure to provide a leak path between the fuel pump and the fuel rail in a second fuel-flow direction opposite the first fuel-flow direction.

12. The fuel system of claim 11, further comprising a fuel line fluidly communicating the inlet end of the passageway and the fuel pump, wherein the residual pressure in the fuel rail is greater than the pressure in the fuel line between the inlet end of the passageway and the fuel pump when the biasing member moves the seal member from the first position to the second position.

13. The fuel system of claim 12, wherein the biasing member moves the seal member from the first position to the second position when the residual pressure in the fuel rail drops to a pressure between about 10 kPa and about 100 kPa.

14. The fuel system of claim 11, further comprising an orifice in fluid communication with the passageway, wherein the orifice decreases the flow rate of pressurized fuel through the passageway in the first fuel-flow direction.

15. The fuel system of claim 14, wherein the orifice is positioned at least partially within the passageway.

16. The fuel system of claim 11, further comprising a retainer positioned downstream of the seal member in the first fuel-flow direction, wherein the seal member engages the retainer when the seal member is in the second position, and wherein pressurized fuel flows past the retainer in the first fuel-flow direction during fuel pump operation.

17. The fuel system of claim 16, wherein the passageway defines a central axis, wherein the retainer includes at least one projection extending in a direction toward the central axis, and wherein the seal member engages the at least one projection when the seal member is in the second position.

18. The fuel system of claim 11, wherein the biasing member includes a compression spring.

19. The fuel system of claim 11, wherein the seal member includes a spherical ball.

20. The fuel system of claim 11, further comprising:
a fuel line fluidly communicating the fuel pump and the fuel rail; and
a check valve positioned in the fuel line, wherein the passageway is fluidly connected with the fuel line in a parallel relationship such that pressurized fuel discharged by the fuel pump flows through one of the check valve and the passageway during fuel pump operation.

* * * * *